United States Patent [19]

Lerner

[11] 4,449,900
[45] May 22, 1984

[54] PRILLING

[76] Inventor: Bernard J. Lerner, 727 Orchard Hill Dr., Pittsburgh, Pa. 15238

[21] Appl. No.: 525,987

[22] Filed: Aug. 24, 1983

Related U.S. Application Data

[62] Division of Ser. No. 394,297, Jul. 1, 1982, Pat. No. 4,424,072.

[51] Int. Cl.³ .......................................... B29C 23/00
[52] U.S. Cl. ........................................ 425/6; 264/12; 71/28; 71/59; 71/64.06; 71/64.1; 423/397; 564/63
[58] Field of Search .................................. 425/6, 222; 423/395-397; 564/63; 149/46, 109.6; 71/11, 64.06, 64.1, 59, 28-30; 264/12

[56] References Cited

U.S. PATENT DOCUMENTS

3,819,310  6/1974  Mavrovic ................................ 425/6
3,975,472  8/1976  Packbier et al. ....................... 425/6
3,979,168  9/1976  Chauvin ................................. 425/6

Primary Examiner—Ferris H. Lander
Attorney, Agent, or Firm—Hymen Diamond

[57] ABSTRACT

Prilling apparatus for producing prills of ammonium nitrate or urea in which a diverging shroud extends from each prilling head. Means for supplying ammonia is connected to the shroud. The prills pass through a quiescent zone of ammonia in the shroud and the generation of fumes from the apparatus is suppressed. In addition, the prills are coated with a layer of ammonia and are more readily cooled.

13 Claims, 8 Drawing Figures

PRILLING

REFERENCE TO RELATED APPLICATION

This application is a division of application Ser. No. 394,297, filed July 1, 1982 now U.S. Pat. No. 4,424,072, Jan. 3, 1984 to Bernard J. Lerner for Prilling and assigned to Westinghouse Electric Corporation.

BACKGROUND OF THE INVENTION

This invention relates to the granulation of materials and has particular relationship to the formation of free flowing solids consisting of substantially uniform spherical particles of ammonium nitrate and urea from melts of these materials. The spherical particles are called prills and the formation of prills from the melts is called prilling. Prills of ammonium nitrate and urea are used for agricultural fertilizer. Ammonium nitrate and urea are the principal types of nitrogen fertilizer in current large-scale commercial production.

This application concerns itself predominantly with prilling of ammonium nitrate and urea to form prills with respect to which it has unique advantages. It is to be understood that to the extent that this invention is adaptable to other materials and in other areas, such adaptation is within the scope of equivalents of this application and of any patent which may issue on or as a result thereof as scope of equivalents is interpreted and defined in Graver Tank & Manufacturing Co., v. Linde Air Products Co., 70 S Ct. 854 (1950).

In conventional fertilizer prilling operations, molten ammonium nitrate or urea is sprayed countercurrent to a stream of air in a relatively tall empty tower, and is cooled by the air and solidified and dried so that prills are produced. The air may be forced through the tower by fans, or natural draft may be employed to secure adequate air counterflow. In some prilling towers, auxiliary air may be locally in concurrent flow with the molten-particle flow; in this case there is also major air flow countercurrent to the particle flow.

Other methods of generating spherical solid particles include spheroidizers, pan granulators and fluidized bed techniques. In these latter methods, liquid fertilizer at relatively high temperatures is coated onto a mass of smaller particulates which are maintained in constant motion and are simultaneously cooled and dried by exposure to an air stream.

Spray nozzles of various types have been used to initially form and disperse the molten fertilizer into droplets. These include simple spray nozzles, comprised of planar or curved plates, containing many small holes or orifices, mechanically-driven centrifugal spray disks or buckets, and vibrating orifice plates. In all cases, however, molten material is fed to one or more such dispersion devices, so arranged as to disperse the molten drops more or less uniformly over the cross-sectional area of the prill tower.

In these high-temperature operations, including the prilling as well as the other methods, the ammonium nitrate or urea generates visible fumes which are a serious air-pollution problem. The postulated mechanisms involved in fume formation include both simple condensation of the sublimed vapors on cooling, and the possible recombination from the vapor phase of the chemical products resulting from dissociation.

In an article entitled, "Vapor Pressure of Ammonium Nitrate," published in the Journal of Chemical and Engineering Data, Vol. 7, No. 2, pages 227-228, April 1962, J. D. Brandner, N. M. Junk, J. W. Lawrence and J. Robins suggested that both solid and molten ammonium nitrate vaporize primarily by dissociation into ammonia and nitric acid. This reaction may be reversible and the theoretical back-reaction to ammonium nitrate from the cooler vapor phase may possibly form a submicron aerosol fume of ammonium nitrate solids. A parallel reaction may be written for the case of urea prilling, where dissociation again is from a hot melt or solution, to possible dissociation vapor products of ammonia and organic acids such as isocyanuric acid. These are conjectural mechanisms of fume formation, formulated to explain the apparent exponential increase in fume formation with increasing temperatures. It is not intended that their mention here should in any way affect this application or any patent which may issue on or as a result thereof.

In U.K. Pat. No. 1,208,850, H. E. Todd discloses the inhibition of fumes from hot ammonium nitrate vapor by adding ammonia to the air used to cool and/or dry or solidify hot solutions of ammonium nitrate. Todd states that "the desired amount of ammonia is injected into the inert gas stream before the gas contacts the ammonium nitrate." Brandner, et al. teaches that "by passing ammonia with nitrogen through a sample of ammonium nitrate . . . with both solid and liquid ammonium nitrate, the weight loss per liter of nitrogen passed through the sample is reduced to a fraction of its magnitude in the absence of ammonia."

The data presented by Todd in U.K. Pat. No. 1,208,850 on ammonium nitrate fume suppression by ammonia addition to air covers the range of 220° F. to 277° F. These data were presented in graphical form and show that, at 244° F., a concentration of 0.083% by volume $NH_3$ in air was required for fume suppression, while at 277° F. ammonium nitrate temperature, a 75% reduction in fume level required a concentration of 0.29% $NH_3$ by volume in air. The temperature range (to 277° F.) covered by the Todd data is not characteristic or representative of the ammonium nitrate prilling temperatures employed commercially. Prilling of both ammonium nitrate and urea normally takes place industrially at temperature levels in excess of the melting points of these materials, which are 337° F. and 271° F., respectively. Industrial prilling temperatures for ammonium nitrate are generally in the range of 345° F. to 380° F., and at these temperatures, the concentration of $NH_3$ in air required for any significant fume suppression becomes uneconomically large. For example, it has been estimated that for an ammonium nitrate temperature of 380° F. an $NH_3$ concentration of 1.5% would be required for 80% fume suppression, and 6% $NH_3$ concentration for 90% suppression. For a typical ammonium nitrate prilling tower producing 1000 tons/day of prills, using 200,000 CFM of forced air flow, the 6% by volume $NH_3$ requirement is equal to 17 tons/hr. of $NH_3$. To avoid losing this much $NH_3$ to the exhaust air, the $NH_3$ would have to be scrubbed out of the exhaust air. If $HNO_3$ solution is used for absorption, a minimum of 63.2 tons of $HNO_3$ per hour is needed to neutralize the $NH_3$. This would be equivalent to manufacturing more than 80 tons/hr. of ammonium nitrate in the exhaust air scrubber, or 1925 tons/day, which is almost double the amount of the initial plant capacity. At 1.5% $NH_3$ by volume, corresponding to 80% fume suppression, 8500 lbs./hr. of $NH_3$ would be needed, as would 15.8 tons of $HNO_3$/hr. for neutralization. It is therefore clear that the NH3 feed rates and the associated scrubbing loads and limits that are needed to suppress fume formation in the prilling operation by the method of Todd are impractical and uneconomic at temperatures in excess of the prill material melt point, which elevated temperatures are invariably and necessarily used in prilling.

It is an object of this invention to overcome the drawbacks and disadvantages of the above-described prior art and to provide prilling apparatus in whose use fumes shall be suppressed economically by use of ammonia in relatively low quantities.

In accordance with this invention, prilling apparatus is provided which establishes and maintains a quiescent zone of pure, or highly concentrated, NH3 directly below and in contact with the molten ammonium nitrate or urea dispersion device or spray nozzle orifices forming the spray. The spray particles are formed in, and initially fall through an NH3, or NH3-rich, gas zone. This relatively stagnant ammonia atmosphere is formed and contained under the spray head by means of an outer shroud or bell whose skirt extends below and contiguous to the bottom of the molten fertilizer spray nozzle or dispersion device. Ammonia gas or an atmosphere enriched in ammonia and containing more than 50% by volume ammonia is fed to this shroud or bell. Although any ammonia-rich gas containing more than 50% by volume may be employed, particularly if a waste gas of this composition is available, it is preferable to use ammonia gas of 95 to 100% ammonia concentration. Gas streams of the latter composition are normally available in a fertilizer plant at super-atmospheric pressures, or alternately, are easily generated from liquid ammonia. Because ammonia is less dense than air, the shrouding of the molten material spray nozzle provides for the establishment of the desired stable zone of relatively quiescent ammonia by trapping the ammonia under the shroud by reason of density differential relative to the air outside the shroud. Additionally, the ammonia trapped under the shroud is continuously heated by the molten prill and this augments the inherent molecular weight gas density difference relative to air. The ammonia is concentrated in the hottest region directly under the spray nozzle where the hottest material is emitted and is thus heated to a higher degree than the air below or outside the shroud.

In some prilling towers, a plurality of spray nozzles or dispersion devices, as many as 20 or more, may be provided. In such towers, a single shroud may be provided for the assembly of spray nozzles or dispersion devices, or several shrouds may be provided, each for several of the spray nozzles or dispersion devices. A single shroud is provided in prilling towers which have a single central spray nozzle or dispersion device.

Whether fume formation occurs because of dissociation/recombination, vapor pressure, sublimation/condensation, or other mechanisms, the tendency to form fumes increases with increasing temperature. By whatever suppression mechanism, exposure of the hottest ammonium nitrate or urea melt to the pure or enriched ammonia atmosphere completely suppresses fume formation at this zone. The quantity of ammonia required for accomplishing total fume suppression by use of a trapped quiescent atmosphere is small compared to the flow of countercurrent cooling prill tower air. It is also small relative to the amount of ammonia required for the air dilution method of Todd. The latter method presents a diluted low-concentration gas stream uniformly to the spray over its entire drop path in the prill tower, over which the spray temperature varies from molten liquid temperatures as high as 380° F. at the spray header to 200° F. at the bottom of the tower. It has been realized in arriving at this invention that because the ammonia-air concentration requirements for fume suppression vary with spray temperature, with the maximum ammonia concentrations being required for the hottest spray, Todd's air dilution method uses uneconomical and excessive amounts of ammonia to achieve suppression for the hottest top portion of the tower. Alternately, Todd's method accomplishes incomplete fume suppression at lower average ammonia concentrations which inhibit fume formation in the lower and cooler portion of the prill tower, but not at the hotter upper regions.

In the practice of this invention, the hottest spray is exposed to the highest ammonia concentration. In falling through and out of the trapped zone of ammonia created in accordance with this invention, the spray particles carry with them a laminar and stagnant boundary layer of ammonia. The particles are thus "coated" or enveloped by a gaseous surface layer of ammonia. This phenomenon is similar to that encountered in high-diving into water, wherein the diver on entering the water carries with him an entrained layer of air. The concentration of ammonia in the laminar sublayer adjacent to the cooling prill surface is diminished only by the molecular diffusion of ammonia into the surrounding air zone, which is a slow process, and by convective heat transfer. However, as the spray cools, the ammonia concentration required for fume suppression decreases, so the two effects of loss of ammonia with distance of fall of spray and decreasing temperature serve to counterbalance each other. The acceleration of the cooling of the spray is an additional advantage of the invention.

BRIEF DESCRIPTION OF DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF INVENTION

Figure 1:
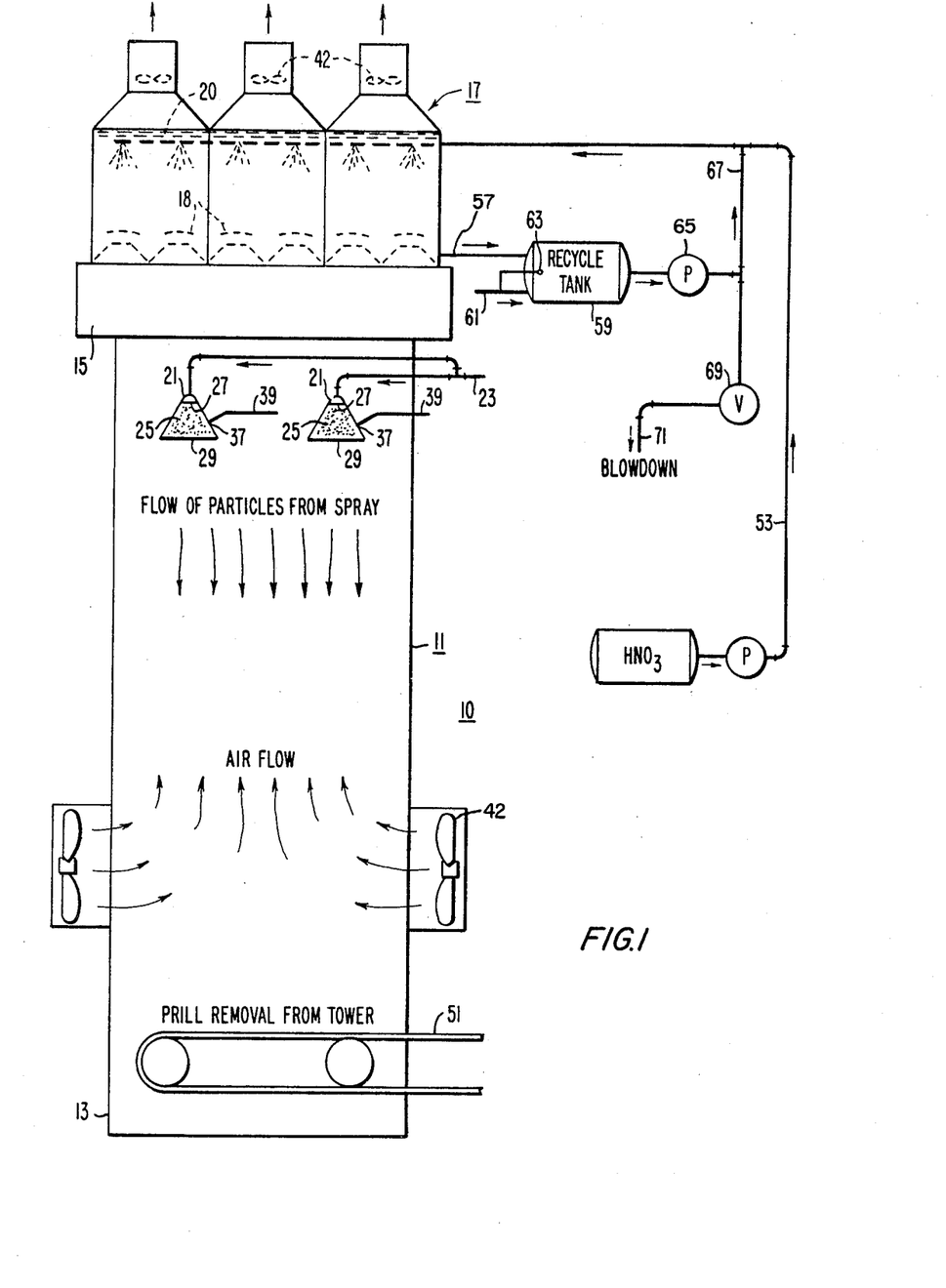
FIG. 1 is a diagrammatic view showing a prilling tower with this invention.
Figure 2:
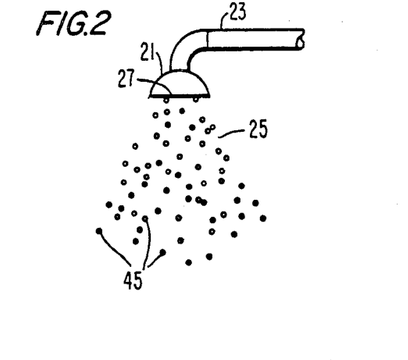
FIG. 2 is a fragmental diagrammatic view illustrating the operation of the prilling head or spray nozzle for the molten material in the practice of this invention.

The apparatus 10 shown in FIG. 1 includes a vertical prilling tower 11. The tower 11 is an enlarged member of circular or rectangular transverse cross-section composed of aluminum (for $NH_4NO_3$) or concrete or other suitable material. A concrete tower may be lined with aluminum if the prilling material in the tower is corrosive. The tower 11 has a base 13 and is open at the top, but has a superstructure 15. Above the top, a plurality of scrubbers 17 are provided. The exhaust from the tower 11 flows into the scrubbers through liquid rain shields 18 which prevents liquid from running back into the tower. The scrubbed gas passes into the atmosphere through mist eliminator 20. Alternately, the tower 11 may be provided with a top and a conductor may be provided to conduct the exhaust to scrubbers at the ground or to a lower level.

Figure 5:
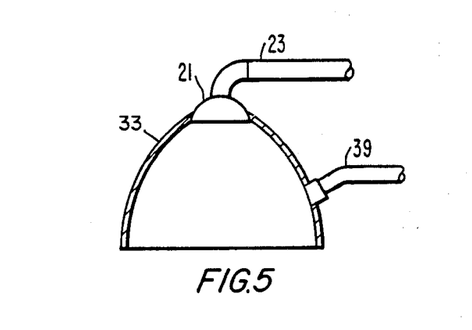
FIGS. 5 and 6 are diagrammatic views showing shrouds of apparatus in accordance with this invention.
Figure 6:
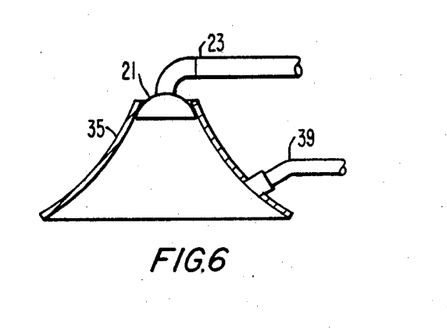

Prilling heads or nozzles 21 for producing a spray are suspended near the top of tower 11. The prilling heads 21 are connected to a line or conductor 23 through which molten ammonium nitrate or urea is supplied. The melt is projected downwardly through each prilling head 21 in a spray 25 which may have generally conical shape of cross-section depending on the configuration or operation of the prilling head 21 and with the prilling head at the apex. Strictly, the configuration has the shape of a frustrum of a cone (or of a pyramid) with the plane 27 of drop formation of the prilling head, which may be called the dispersion plane, defining the base of smallest area from which the spray diverges. The spray spreads out into the prilling tower 11. A conical shroud 29 extends from each prilling head 21 with the head at the apex. The joint 31 (FIG. 3) between the prilling head 21 and the shroud 29 is sealed gas tight. In lieu of being conical, the shroud may have the form of a bell 33 (FIG. 5) or it may be flared as the shroud 35 shown in outline in FIG. 6. The inner surface of the shroud 29, 33, 35 must diverge from the prilling head in such manner that it is not contacted by the spray 25. For example, the solid angle of the conical shroud 29 must be at least so great that the inner surface of this shroud is parallel to the lines of flow of the spray.

Figure 3:
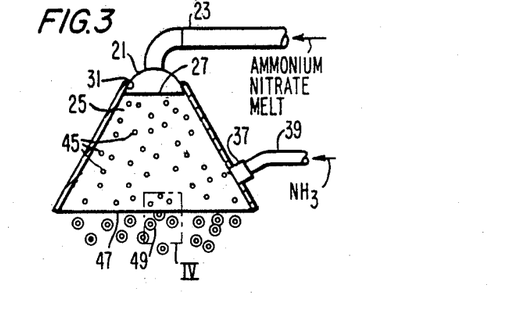
FIG. 3 is a fragmental view of the portion of the prilling tower shown in FIG. 1, in the circle III of FIG. 1, predominantly showing the shroud in longitudinal section.

The shroud 29 has an inlet 37 to which a gas line or gas conductor 39 is connected. Ammonia, either in relatively pure form or mixed in high concentration in a gas, such as air, is injected into the shroud through the line 39 and inlet 37.

The apparatus 10 also includes facilities for injecting a stream of air into the lower part of prilling tower 11. This may be accomplished by forced draft, induced draft or combination thereof. Air may be forced into the tower 11 by fans 41 through louvers (not shown). The scrubbers 17 are provided with fans 42 to compensate for scrubber system pressure drop and, in some cases, to provide for induced draft for the prilling tower 11. In either event, the particles in the fertilizer spray 25 flow countercurrent to the air and are cooled by the air.

Figure 4:
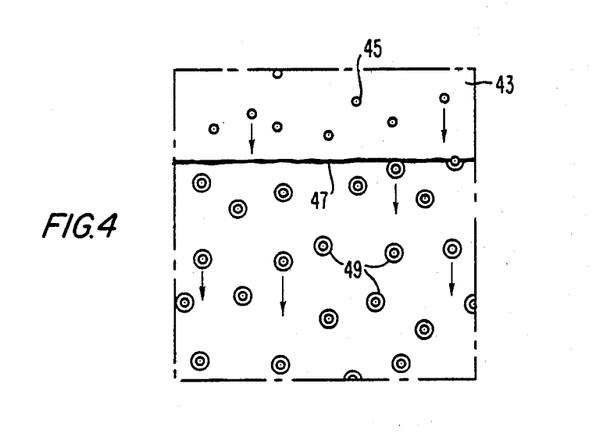
FIG. 4 is a fragmental view showing, in the rectangle IV of FIG. 3, the relationship between the ammonia gas, molten fertilizer spray and air.

The ammonia which flows into the shroud 29, because it is lighter than air, rises in the shroud producing a stagnant atmosphere of ammonia 43 (FIG. 4) within the shroud. The particles 45, as they leave the prilling head 21, and are at their highest temperature, pass through this atmosphere 43. It has been found that the ammonia has the effect of suppressing the formation of fumes. In addition, the particles of the spray, as they leave the interface 47 between the ammonia and the upwardly flowing air, are coated with a layer 49 of ammonia. This coating contributes to the continued suppression of fumes and in addition, has the unique advantage of accelerating the cooling of the particles so that they are converted into prills. The prills are deposited on conveyor 51 and removed from the tower 11.

As has been stated, each shroud 29 surrounding the prilling head must be joined gas-tight to the head, to retain the lighter-than-air ammonia gas. Each shroud must project below the plane 27 of drop formation to provide a minimal ammonia gas layer contact thickness. The required vertical depth of a shroud varies with the type of the associated prilling head, but in general, a trapped ammonia zone thickness below the plane 27 of drop formation of from 25 to 70% of the largest diameter of the shroud may be employed. In the case of conventional multi-orifice spray plates, an ammonia zone depth of from 6 to 18 inches below the plate is preferred for a shroud 29 having a maximum diameter of 26.75 inches. The limit on the obtainable depth of the ammonia zone below the plane 27 of drop formation is dictated primarily by the solid spray angle and the necessity of elevating the shroud wall perimeter above the spray to avoid interference and wall buildup. Accordingly, each shroud wall is preferably flared (FIG. 6) or bell-shaped (FIG. 5) to avoid interfering with the spray, while still providing for the stagnant ammonia zone required below the plane 27. While the deepest stagnant ammonia zone is preferred, there is a practical geometrical limit on this depth for a conical, flared or bell-shaped prilling head. The bottom diameter of the shroud increases with increase in vertical depth of the ammonia layer, and therefore blocks an increasing proportion of the free air-flow cross-sectional area of the tower. For a very deep shroud, the acceleration of the air through the restricted flow area unoccupied by the shroud induces a venturi effect around the shrouds, which tends to aspirate the ammonia out from within the shrouds. At conventional prill tower linear air velocities of from 3 to 10 feet/second, significant venturi effects would not occur below about 50-75% reduction of empty tower free flow area. However, increasing the projected shroud area normal to air flow increases both the local air velocity and the ammonia zone area subject to air impaction and disturbance, so that it is preferable to have the minimum shroud diameter commensurate with the prill spray angle and preferred range of stagnant ammonia zone thickness.

The ammonia trapped under a shroud 29 surrounding a prilling head is lost to the surrounding air by several mechanisms. These include volumetric displacement by the spray, boundary layer coating of the particles of the spray leaving the quiescent ammonia zone, and air impaction on the shroud opening. The amounts of ammonia lost by means of the first two mechanisms may be directly estimated. For an ammonium nitrate prill rate of 100,000 pounds per hour, where the nitrate has a specific gravity of 1.43, the displacement volume of the particles of spray would be 1121 cubic feet per hour. For an assumed 180° F. ammonia-gas temperature in the shroud, this displaced volume is equal to 862 standard cubic feet per hour, or 40.8 pounds per hour, of ammonia.

The consumption of ammonia due to boundary layer coating of the spray particles may be estimated for the same 100,000 pounds per hour production rate. For a 200,000 CFM rate of air flow in a 400 square foot cross-sectional area prill tower, the linear air velocity is 500 feet per minute. Neglecting the particle fall velocity and assuming an average particle size of 5/64 inch, the Reynolds number corresponding to this particle size, and air properties at an average of 115° F., is 228. This Reynolds number for a sphere is in the laminar-to-turbulent flow transition zone, but adding on the particle fall velocity, a turbulent flow condition is indicated. For turbulent flow conditions, a boundary layer thickness of approximately 0.2 mm. may be estimated, according to W. L. McCabe and J. C. Smith, "*Unit Operations of Chemical Engineering,*" page 61, Third Edition, McGraw Hill Book Company, New York, 1956. For the 5/64 inch diameter particles, at 100,000 pounds per hour, there will be $7.76 \times 10^9$ particles/hour. At 0.2 mm. boundary layer thickness, each prill has a boundary layer volume of $1.061 \times 10^{-7}$ cubic feet, and the total volume per hour of ammonia contained in this boundary volume is:

$$V_{amm.} = (1.061 \times 10^{-7})(7.76 \times 10^9)$$
$$= 823 \ CFH$$

If a mean boundary layer temperature of 150° F. is assumed, this ammonia consumption rate is equal to 664 standard cubic feet per hour, or 31.4 pounds per hour of ammonia. Thus, displacement losses plus boundary layer coating requirements for 100,000 pounds per hour production totals only 72.2 pounds per hour.

It is not feasible to estimate the ammonia losses caused by air impaction on the open shroud 29, but a test run of the method of this invention at about 54,000 pounds per hour on a commercial prill tower, using only two shrouded prilling heads, showed that an ammonia rate of about 72 pounds per hour were required as a shroud feed for fume suppression. This would indicate that, at 100,000 pounds per hour production rate, a total of 133 pounds per hour would be required in the shroud. Therefore, the ammonia lost to air impaction and turbulence may be taken as approximately equal to the total of volumetric displacement losses and boundary layer coating requirements. The indicated rate of 133 pounds per hour ammonia usage at 100,000 pounds per hour ammonium nitrate production rate is only 2.67 pounds of ammonia per ton of production.

As has been stated, another benefit of imparting an ammonia boundary layer to the particles of the spray as compared to an air boundary is a significant increase in the cooling rate of the particles, with a consequent increase in prill tower production capacity. This surprising and unexpected benefit results only from the method of ammonia-coating of the particles in the practice of this invention, and not from the technique of ammonia addition to the air stream as taught by the prior art. In the practice of this invention, the air boundary layer is replaced by an ammonia boundary layer, and a comparison of the resulting respective heat transfer coefficients indicates a potential 27% advantage in cooling for the ammonia-coating method. This gain may be estimated from the following calculations.

The fundamental equation for the convective heat transfer coefficient from a sphere to a gas is given by A. C. Carslow and J. C. Jaeger, "*Conduction of Heat in Solids,*" pp. 234-241, Oxford University Press (1959) as:

$$h_c = 0.6 \frac{k}{D} \left[ \frac{2\rho^2 D^3 g \Delta \rho}{\mu^2 (\rho_1 \rho_2)} \right]^{\frac{1}{4}} (Pr)^{\frac{1}{3}}$$

where $h_c$ = convective heat transfer coefficient
$k$ = heat capacity of gas
$D$ = spherical particle diameter
$Pr$ = Prandtl number
$\mu$ = gas viscosity
$\rho$ = gas density
$\Delta \rho$ = gas density difference, boundary layer temperature vs. bulk gas temperature Assuming an initial particle surface temperature of 350° F. and substituting the physical properties of ammonia and air, respectively, the ratio of $(h_c)$ NH$_3$ to $(h_c)$ air reduces to:

$$\frac{(h_c)NH_3}{(h_c)air} = \left( \frac{0.043}{0.036} \right) \left[ \frac{1.395 \times 10^8}{1.4033 \times 10^8} \right]^{\frac{1}{4}} \left[ \frac{0.8635}{0.7147} \right]^{\frac{1}{3}}$$

and $$(h_c)NH_3 = 1.270 \ (h_c)air$$

There is then a potential increase of 27% in the heat-transfer rate from the particle with an ammonia-gas boundary layer as compared to an air boundary layer.

The exhaust gas from the prilling tower 11 includes ammonia. The loss of the ammonia used for fume suppression to the atmosphere, even at the reduced rates called for by the practice of this invention, is economically and environmentally unacceptable, and it is therefore desirable that this added ammonia be removed from the tower exhaust air and recovered. This is accomplished by scrubbers 17. A procedure which is suggested is to recover the ammonia by once-through water wash. This is not an effective or desirable method because it is then necessary to treat the scrubber effluent stream prior to disposal or to use the dilute ammonia stream in the plant process. The dilute ammonia exhaust wash liquor cannot be recycled through the scrubbers 17 because the ammonia solution backpressure increases as the ammonia concentration increases, and the absorption of ammonia ceases when the solution ammonia vapor-pressure approaches the partial pressure of ammonia in the air leaving the tower.

An alternate method of scrubbing out the ammonia in the case of ammonium nitrate or urea prill towers is to use a dilute solution of a non-volatile acid as the ammonia-absorbing liquor. This assures that the solution has zero ammonia back-pressure and maximizes the absorption driving force, giving rapid and complete ammonia removal in a very compact scrubbing device, such as a simple spray scrubber.

Among the non-volatile acids that may be used are phosphoric, sulfuric, nitric and the like. Oxidizable acids, such as organic acids, are hazardous in an ammonium nitrate plant and their use would therefore not be practical. It is advantageous to use an acid, such as HNO$_3$, which is normally made in the plant production sequence and which, on reaction with ammonia, yields a compound which is the same as the end plant product. Therefore, nitric acid is the preferred absorption acid in the ammonium nitrate prill tower case.

The removal of the ammonia from the exhaust and its conversion into a useful compound is shown in FIG. 1. The exhaust gas flows through conductor 16 into the lower regions of the scrubbers 17 and is conducted upwardly. The exhaust gas is contacted directly by a reactant which is supplied through conductor 53 to spray heads 55 as disclosed in Lerner Pat. No. 3,895,926. The liquid solution which contacts the ammonia first absorbs the ammonia. The ammonia being absorbed in the liquid solution simultaneously reacts with the free reactant acid in the solution. A zero backpressure of ammonia from the solution is thus achieved. The reactant converts the absorbed ammonia into a stable non-volatile compound. Where the prills are composed of ammonium nitrate, the reactant is nitric acid as shown in FIG. 1. The nitric acid solution is sprayed countercurrently on the exhaust gas absorbing and converting the ammonia in the exhaust into ammonium nitrate. The ammonium nitrate is in solution and is supplied through conductor 57 to recycle tank 59 containing the ammonium nitrate solution. Make-up water to replenish the water in tank 59 is supplied through conductor 61. The flow through conductor 61 is controlled by flow switch 63. The liquid in the recycle tank 59 is recycled by pump 65 through conductor 67. The concentration of ammonium nitrate in recycle tank 59 is monitored. When this concentration reaches a predetermined magnitude, valve 69 is opened and the ammonium nitrate is transferred to a product recovery facility through blowdown conductor 71.

An advantage of using a dilute nitric acid solution to absorb ammonia from ammonium nitrate prill tower exhaust air, practicing this invention, is that ammonium nitrate is continuously formed in the scrubbing liquor, and the solution is recycled through scrubbers 17 until a desired concentration level is achieved. The solution which reaches this concentration is recovered through blowdown conductor 71. To minimize downstream energy requirements for concentration of dilute ammonium-nitrate solution scrubber blowdown, it is desirable that typically a minimum concentration of 20% ammonium nitrate be maintained in the recycle tank 59. Recycle concentrations of more than 60% by weight ammonium nitrate have been achieved in tests on an industrial prill tower scrubber, but operation at concentrations greater than 60% by weight is undesirable because of the danger of freezing the solution in the lines if the ambient exhaust air wet-bulb temperature decreases below the elevated solution freezing point.

Nitric acid is continuously added through conductor 53 to the recycle liquor to maintain scrubber recycle solution acidity as ammonia is absorbed from the exhaust air. Because water is continuously evaporating into the warm dry air leaving the prill tower and entering the scrubber, it is advantageous to use concentrated acid, of about 53% nitric acid by weight, to maintain the recycle solution acidity. If too dilute an acid is used, the water being added with the acid may be greater than the evaporation rate, so that the recycle solution ammonium-nitrate concentration will not be maintainable at the desired concentration level of 20% or above. Further, 50–60% is the approximate nitric acid concentration generally available in an ammonium-nitrate plant operation. The prime disadvantage of adding relatively concentrated nitric acid to the scrubber recycle liquor is the possibility of secondary generation of ammonium nitrate fume in the scrubber. Nitric acid concentrations above about 2–5% by weight may have sufficient nitric-acid or nitric-oxide vapor pressures to generate fume via a vapor-phase reaction with the gaseous ammonia in the prill tower exhaust air. It has been discovered that secondary fume formation in the scrubber can be avoided by using a very high liquid/gas scrubbing ratio, in the range of 5–25 gallons of recycle liquor per 1000 ACFM (actual cubic feet per minute) of air, and preferably in the range of 10–15 GPM/1000 CF. In this way, a dilution "sink" is provided for the acid, which reduces the concentration entering the scrubbers 17, and contacting the ammonia/air mixture, to levels where the vapor pressure of the acid is negligibly small. It is desirable to limit the nitric-acid concentration entering the scrubbers to less than 2% by weight, and preferably less than 0.4% by weight. For a maximum ammonia usage of 300 lb./hr. in a 1000 ton/day, 200,000 ACFM prill tower, the acid requirement is 2097 lbs./hr. of 53% $HNO_3$. To dilute this acid to 0.4%, it must be mixed with 27,942 lb./hr. of dilution liquor, or roughly, 555 GPM of additional non-acid solution. At the minimum 5 gallons recycle/1000 CF of scrubber operation, recycle provides 1000 GPM of dilution liquor. This dilution is about twice that of this minimum, and secondary fume formation is avoided.

In the application of this invention to urea prill towers and the like, the non-volatile dilute acid solutions which may be used in the ammonia absorbers are inorganic acids such as phosphoric, sulfuric and nitric, and organic acids such as citric, oxalic and similar non-volatile organic acids.

To recycle scrubber solution blowdown back to the urea-forming process, it would be desirable to generate ammonium bicarbonate in the ammonia absorption scrubber. This would require the use of carbonic acid as the absorbing acid; all other acids would introduce extraneous compounds into the urea flowsheet and would be objectionable. The scrubber recycle liquor blowdown resulting from the use of acids other than carbonic, such as phosphoric, nitric or sulfuric, contain fertilizer values which may be separately concentrated or marketed in liquid form.

Because of vapor pressure considerations, it is not usually practical to scrub ammonia from urea prill tower exhaust air with recycle ammonium bicarbonate/carbonic acid solutions at atmospheric pressure. The vapor pressure of ammonia, i.e., solution backpressure, can be reduced below the normal air partial pressure range of ammonia in the practice of this invention (0.1 to 1.0 mm Hg) only by the use of solutions having a high $CO_2$ to $NH_3$ ratio, and thus excessively high $CO_2$ vapor pressures. While it is possible to generate such scrub solutions, the $CO_2$ losses would be uneconomically large. It is most practicable to remove the ammonia with phosphoric acid and recover the ammonia as ammonium phosphate. The phosphoric acid is sprayed into the scrubbers 17 and the ammonium phosphate is passed through a recycle tank similarly to the ammonium nitrate and nitric acid in the apparatus shown in FIG. 1.

Figure 7:
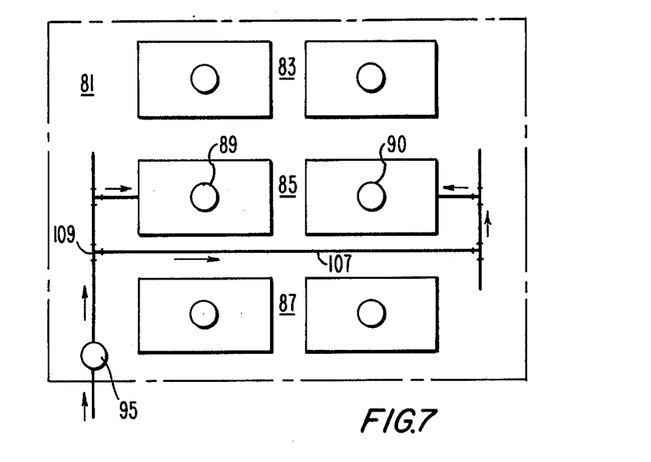
FIG. 7 is a diagrammatic plan view of a prilling tower assembly including three bays which were used in carrying out studies on this invention.

Preliminary tests of this invention were conducted in a facility 81 (FIG. 7) for commercial generation of ammonium nitrate prills of agricultural fertilizer. The facility 81 includes 3 bays, 83, 85, 87, with two prilling nozzles in each bay. The tests were conducted with the nozzles 89 and 90 in the central bay 85.

Figure 8:
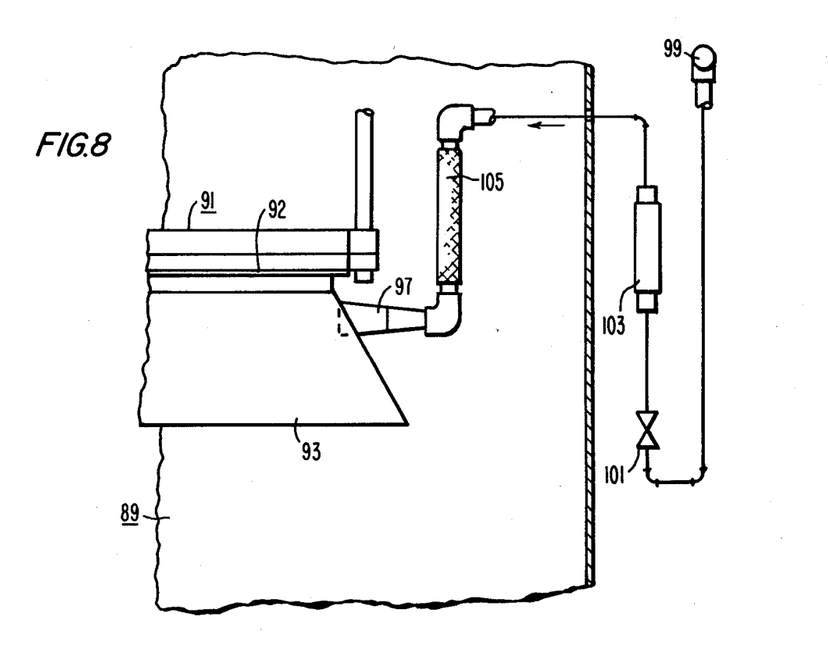
FIG. 8 is a diagrammatic view showing the manner in which ammonia was supplied to the shrouds of the prilling towers of FIG. 7 when this study was carried out.

The prilling head connector 91 (FIG. 8) of each nozzle 89 and 90 was provided with a shroud 93. The perpendicular distance between the plane 92 of melt drop formation of the prilling head 91 and the plane defined by the rim of the shroud was about 12 inches. The shroud flared out from the plane 92 and then extended at an angle of about 60° to the horizontal. Liquid ammonia (source not shown) was vaporized by vaporizer 95 and supplied to the inlet fixture 97 of the shroud 93 of nozzles 89 and 90 through a header 99, a needle valve 101, a rotameter 103 and a flexible hose 105 (FIG. 8).

The center of the inlet fixture 97 was about 4 inches below the plane 92 of melt drop formation. The shroud 93 attached to prilling head connector 91 was similarly supplied through a branch channel 107 (FIG. 7) connected to the header 99 through a T-joint 109.

Prills of ammonium nitrate were produced while the test was conducted. The prilling temperature was 345° F. About 80 gallons per minute or about 689 tons of prills per day were produced. The ammonia was supplied initially at the rate of 20 pounds per hour. At this rate, unmistakable suppression of fuming was observed, but the opacity measured was about 70%. Four hundred pounds per hour of ammonia was introduced at the base of the prilling tower. Reduction of opacity to about 50% was then noted. With the supply of ammonia at 400 pounds per hour at the base of the tower, the supply of ammonia to the shrouds 93 was raised to 74 pounds per hour. Reduction of opacity to 10% was observed. With the rate of feed of ammonia to the shrouds 93 at 74 pounds per hour, the supply of 400 pounds per hour of ammonia to the base of the tower was discontinued. Opacity of 40% was observed. Scheduled production of prills compelled the tests to be temporarily discontinued.

This demonstrates the remarkable effectiveness of this invention. The addition of 400 pounds per hour of ammomia as taught by Todd reduces the opacity only from 70% to 50% while feeding 20 pounds per hour to the shrouds. By increasing the feed to the shrouds by only 54 pounds per hour, the opacity is reduced by 40%. Discontinuation of the 400 pounds per hour and reliance only on the 70 pounds per hour in the shrouds, gave an opacity of 40%; 10% lower than that produced by the 400 pounds per hour as taught by Todd.

While preferred embodiments of this invention have been disclosed herein, many modifications of these embodiments are feasible. This invention is not to be restricted, except insofar as is necessitated by the spirit of the prior art.

I claim:

1. Apparatus for producing prills of one or more of the class of materials consisting of ammonium nitrate and urea, the said apparatus including a prilling tower, means, connected to said tower, for producing therein a spray of a melt of said material at said first position, means producing an atmosphere containing ammonia about said spray-producing means whereby said spray passes through said atmosphere as it is emitted by said spray-producing means, means, connected to said tower, for producing a stream of air in said tower, said air flowing from a second position in said tower, said spray being directed to flow from said first position to said second position through said stream of air so that said spray is cooled and prills of said material are produced, and means, connected to said tower for removing said prills, the ammonia in said atmosphere reacting with said spray as it leaves said spray-producing means so as to suppress the emission of fumes from said tower.

2. The apparatus of claim 1 wherein the ammonia-atmosphere producing means includes a shroud connected to said spray-producing means and means, connected to said shroud, for supplying ammonia thereto.

3. The apparatus of claim 2 wherein the shroud is shaped so that it is not impinged by the spray.

4. The apparatus of claim 3 wherein the shroud is of conical shape diverging from the spray-producing means in the direction from which the stream of air flows.

5. The apparatus of claim 3 wherein the shroud is bell shaped extending from said spray-producing means in the direction from which the stream of air flows.

6. The apparatus of claim 3 wherein the shroud flares towards the direction from which the stream of air flows.

7. The apparatus of claim 1 including scrubber means connected to said tower for removing the ammonia from the gas emitted from said tower.

8. The apparatus of claim 7 wherein the scrubber means includes a scrubber and means, connected to said scrubber, for deriving from said scrubber an ammonium compound thereby reclaiming the predominant portion of the ammonia contained in the gas emitted from the tower.

9. The apparatus of claim 8 wherein the prills produced by the tower are composed of ammonium nitrate and the ammonium compound derived from the scrubber is also ammonium nitrate.

10. The apparatus of claim 8 wherein the prills produced by the tower are composed of urea and the ammonium compound derived from the scrubber is ammonium phosphate.

11. Apparatus, in whose operation fumes are suppressed, for producing prills including a vertical prilling tower having a prilling head near the top thereof, means, connected to said prilling head, for injecting into said prilling head a melt of the material of which the prills are composed to disperse the melt into a spray which is conducted under gravitational force through the tower, a shroud, means mounting said shroud about the prilling head, means, connected to said shroud for injecting into said shroud a gas which suppresses fumes from the tower, and means for injecting a stream of air into said tower in counterflow relationship to the spray to cool the spray and to convert the spray particles into prills and means for collecting the prills.

12. The apparatus of claim 11 including a scrubber, means, connecting said scrubber to said tower, so that the gas emitted from said shroud passes through said scrubber, and means, connected to said scrubber, for supplying to said scrubber, in counterflow relationship to said gas, a liquid reaction with said gas for absorbing said gas.

13. The apparatus of claim 11 wherein the material is ammonium nitrate, the gas is ammonia and the liquid is nitric acid and whereby, recoverable ammonium nitrate is derived from the ammonia.

* * * * *

UNITED STATES PATENT AND TRADEMARK OFFICE
CERTIFICATE OF CORRECTION

PATENT NO. : 4,449,900
DATED : May 22, 1984
INVENTOR(S) : Bernard J. Lerner

It is certified that error appears in the above-identified patent and that said Letters Patent is hereby corrected as shown below:

Column 1, lines 6 and 7, after "Prilling" cancel "and assigned to Westinghouse Electric Corporation".

Signed and Sealed this

Twenty-ninth Day of July 1986

[SEAL]

Attest:

DONALD J. QUIGG

Attesting Officer

Commissioner of Patents and Trademarks